United States Patent [19]
Fujisawa

[11] Patent Number: 5,272,693
[45] Date of Patent: Dec. 21, 1993

[54] DISC CARTRIDGE HAVING A SHUTTER

[75] Inventor: Hirotoshi Fujisawa, Tokyo, Japan

[73] Assignee: Sony Corporation, Tokyo, Japan

[21] Appl. No.: 745,903

[22] Filed: Aug. 16, 1991

[30] Foreign Application Priority Data

Aug. 24, 1990 [JP] Japan .................... 2-222829
Aug. 12, 1991 [JP] Japan .................... 3-225374

[51] Int. Cl.5 ............................................. G11B 23/03
[52] U.S. Cl. .................................. 369/291; 360/133; 206/444
[58] Field of Search ................ 369/291; 360/133; 206/444

[56] References Cited

U.S. PATENT DOCUMENTS

| | | | |
|---|---|---|---|
| 4,787,006 | 11/1988 | Iizuka et al. | 360/133 |
| 4,802,047 | 1/1989 | Tanaka et al. | 369/291 |
| 4,803,678 | 2/1989 | Tanaka et al. | 369/291 |
| 4,908,726 | 3/1990 | Kato | 369/291 |
| 5,084,862 | 1/1992 | Fujita et al. | 369/291 |
| 5,091,901 | 2/1992 | Yamamoto et al. | 360/133 |
| 5,121,380 | 6/1992 | Fujita et al. | 369/291 |
| 5,161,080 | 11/1992 | Funayama et al. | 360/133 |

FOREIGN PATENT DOCUMENTS

0164647A1 12/1985 European Pat. Off. .
0339651A2 2/1989 European Pat. Off. .
0411670A2 2/1991 European Pat. Off. .

*Primary Examiner*—Paul M. Dzierzynski
*Assistant Examiner*—Drew A. Dunn
*Attorney, Agent, or Firm*—Philip M. Shaw, Jr.

[57] ABSTRACT

A disc cartridge includes a cartridge main body which accommodates an optical recording medium, such as an optical disc or a magneto-optical disc, and which includes an aperture for exposing the optical recording medium at least partially to outside, a shutter for opening or closing the aperture, a shutter resetting spring for biasing the shutter towards a side closing the aperture and a shutter locking member for maintaining the shutter at a position closing the aperture. A shutter opening/closing member introducing groove having its open end on a side of the cartridge main body normal to the shutter sliding direction is formed along the front side of the cartridge main body parallel to the shutter sliding direction, and the free end of the shutter locking member is exposed partially to the groove to enable the disc cartridge to be loaded to a cartridge loading section of the recording/reproducing apparatus with the shutter sliding direction as the introducing or loading direction.

21 Claims, 8 Drawing Sheets

DISC CARTRIDGE HAVING A SHUTTER

BACKGROUND OF THE INVENTION

1. Field of the Invention

This invention relates to a disc cartridge having a disc-shaped recording medium accommodated therein. More particularly, it relates to a disc cartridge having a shutter mounted thereon for opening or closing a signal recording/reproducing aperture(s) formed in a cartridge main body.

2. Description of the Related Art

As an optical recording medium for musical sound, picture or other information signals, there has hitherto been employed a read-only optical disc on which desired information signals, such as musical sound information signals, are recorded previously for reproduction after loading the disc on a reproducing apparatus by the user.

As an optical recording medium in which prerecorded signals may be erased and re-recorded, there has also been proposed a magneto-optical disc in which a magnetic thin film is used as a recording layer.

With the optical recording media, such as the optical or magneto-optical discs, recording and/or reproduction of information signals of an extremely high density is possible because a laser beam is employed for recording and/or reproduction of information signals. For example, with an optical disc devoted to reading of prerecorded information signals, reproduction of musical sound signals continuing for about 74 minutes is possible with a disc which is 12 cm in diameter. Recording of information signals of substantially the same volume as that of the optical disc is possible with the optical disc.

Meanwhile, there is also proposed an optical disc or a magneto-optical disc with which a higher recording density may be achieved. For example, there is proposed a method of recording information signals after signal compression for improving the recording density.

With a higher recording density, it becomes possible to record the same volume of information signals as that recorded on a conventional optical recording medium on an optical recording medium of a smaller diameter.

On the other hand, with the optical or magneto-optical disc, with which a higher recording density may be realized, the slightest scores or deposition of the smallest amount of foreign matter on the signal recording surface results in marked deterioration in recording and/or reproducing characteristics.

For this reason, this type of the optical recording medium needs to be accommodated in a sealable cartridge to prevent scoring or deposition of foreign matter during recording, handling or during storage when the recording medium is not loaded on the recording and/or reproducing apparatus. The optical recording medium needs to be accommodated reliably in and protected by the cartridge during storage.

On the other hand, it is required of the recording/reproducing apparatus, having the optical recording medium, thus reduced in size on account of the improved recording density, as a recording medium, to be similarly reduced in size in order to keep up with the reduction in size of the optical recording medium.

OBJECT AND SUMMARY OF THE INVENTION

It is therefore an object of the present invention to provide a disc cartridge with which an optical recording medium accommodated in a cartridge main body may be protected positively and safeguarded against scoring o deposition of foreign matter such as during storage.

It is another object of the present invention to provide a disc cartridge which is provided with a shutter for opening and closing a recording/reproducing aperture provided in the cartridge main body and which is also provided with mistaken recording detection means for indicating whether or not recording may be made on the accommodated disk.

It is a further object of the present invention to provide a disc cartridge which enables the recording and/or reproducing apparatus to be simplified in structure to contribute to reduction in size of the apparatus.

The present invention provides a disc cartridge comprising a cartridge main body having a disc-shaped recording medium accommodated therein and formed with an aperture for exposing at least a portion of the optical recording medium to outside along its radius, a shutter slidably mounted on the cartridge main body for opening or closing the aperture, a shutter resetting spring for biasing the shutter in a direction of closing said aperture, a resiliently flexible shutter locking member for holding said shutter at the position of closing the aperture, and a shutter opening/closure member introducing groove extending on the front side of the cartridge main body parallel to the sliding direction of the shutter and having an opening end at a side of the cartridge main body extending normal to the sliding direction, a portion of the free end of the shutter locking member facing the groove.

The disk cartridge according to the present invention is provided with mistaken recording detection means, in addition to the shutter.

When the disc cartridge is not loaded on the recording and/or reproducing apparatus, the shutter is biased by a shutter resetting spring to a position of closing the aperture adapted for exposing at least a portion of the optical recording medium to outside along its radius, and is locked by the shutter locking member.

When the disc cartridge is to be loaded on the recording/reproducing apparatus, the shutter opening/closure member provided on the apparatus is intruded into the groove from the opening end situated on the side of the cartridge main body extending in a direction normal to the sliding direction of the shutter, and is moved therein along the introducing direction of the cartridge main body to deflect the shutter locking member resiliently for unlocking and sliding the shutter against the bias of the shutter resetting spring for opening the aperture.

Other objects and advantages of the present invention will become more apparent from the following description of illustrative embodiment of the present invention.

DETAILED DESCRIPTION OF PREFERRED EMBODIMENT

The present invention will be explained with reference to an embodiment in which the invention is applied to a disc cartridge 1 accommodating a reproduce-only optical disc with which high density recording of information signals is achieved and on which are recorded musical sound signals continuing for at least 60 and more specifically for 74 minutes.

Figure 1:
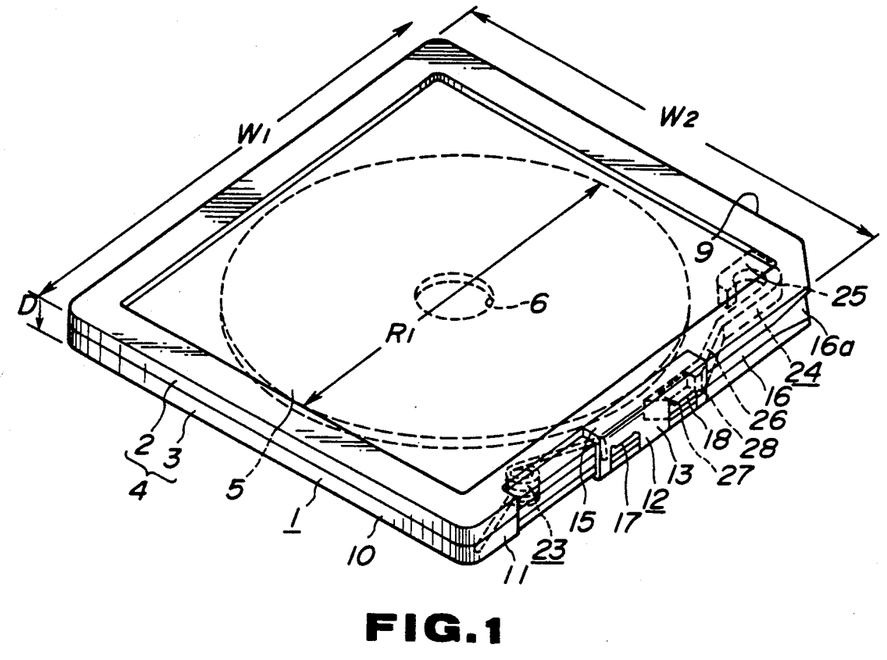
FIG. 1 is a perspective view showing a disc cartridge according to a first embodiment of the present invention, as viewed from its upper side.
Figure 2:
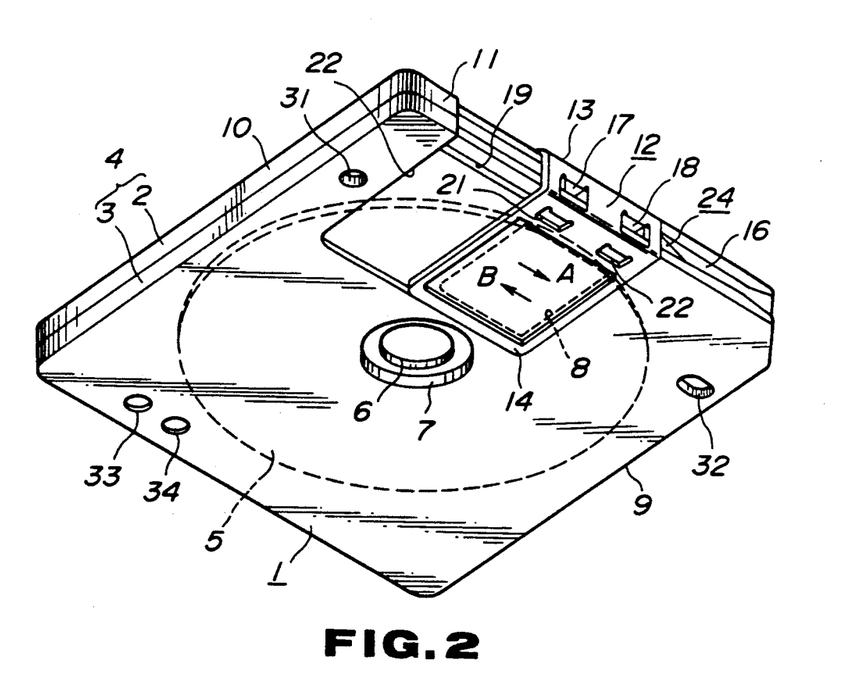
FIG. 2 is a perspective view of the disc cartridge shown in FIG. 1, as viewed from its lower side.

The disc cartridge 1 is comprised of a rectangular cartridge main body 4 consisting of an upper half 2 and a lower half 3 abutted and connected to each other, and a read- or reproduce-only optical disc 5 rotatably accommodated in the cartridge main body. The optical disc 5 has a diameter $R_1$ about 64 mm and has a centering hole 6.

Referring to FIG. 2, the mid portion of the lower half 3 constituting the cartridge main body 3 is formed with a disc table introducing opening 7 which is adapted for exposing the rim of the centering hole of the optical disc 5 to outside and into which is introduced a disc table of a disc driving device for the optical disc 5 on loading the disc cartridge 1 into the recording/reproducing apparatus. The lower half 3 is also formed with a signal readout aperture 8 for radially exposing a portion of the signal recording surface of the optical disc 5 to outside. The aperture 8 is provided between the front side 11 of the cartridge main body 4 and the disc table introducing opening 7 at a mid position between the sides 9 and 10 of the cartridge main body 4, and is in the form of a rectangle of a size large enough to expose a portion of the signal recording surface of the optical disc 5 to outside across the inner and outer peripheries of the disc.

A shutter 12 adapted for closing the aperture 8 of the signal reading aperture 8 is slidably mounted on the cartridge main body 4. The shutter 12 is fabricated by bending a thin metal plate or a plate of synthetic resin, and is constituted by a connecting section 13 slidable along the front side of the cartridge main body 4, a shutter section 14 having its proximal end connected to the connection section 13 and adapted for closing the aperture 8, and an engaging section 15 adapted for engaging with the upper half 2. The connecting section 13 is formed with a spring retention lug 17 adapted for engaging with a shutter opening/closure member introducing groove on the front side 12 of the cartridge main body 4 and for retaining the other end of a torsion coil spring 23, as later described, and a locking lug 18 adapted for engaging with a shutter locking member 24. In the vicinity of a connection area to the connecting section 13, the shutter section 14 is formed with engaging lugs 20, 21 adapted for engaging with a groove 19 formed in the lower half 3 of the cartridge main body 4. The shutter 12 is attached to the cartridge main body 4 with the shutter section 14 extending over the aperture 8 and clamping the area of the front side 11 of the cartridge main body 4 in cooperation with the connecting section 13 and the engaging section 15. The shutter 12 is mounted on the cartridge main body 4 with the spring retention lug 17 and the locking 18 of the connecting section 13 engaging in the introducing groove 16 and with the engaging lugs 20, 21 of the shutter section 14 engaging in the groove 19. Thus the shutter 12, mounted on the cartridge main body 4, is inhibited from accidental extraction and controlled in its sliding movement by the engaging lugs 20, 21 engaging in the groove 16. The shutter 12, mounted on the cartridge main body 4, is slidable between a position closing the aperture 8 in the cartridge main body 4 and a position opening the aperture 8 as shown by arrows A and B in FIG. 2.

The area of the cartridge main body 4 in which the shutter 12 is moved is recessed as at 22 to permit flush mounting of the shutter 12 with respect to the surface of the cartridge main body 4.

At a corner on the front side 11 of the cartridge main body 4, there is provided a torsion coil spring 23 as biasing means for normally biasing the shutter 12 in a direction of closing the aperture 8. The torsion coil spring 23 is mounted within the cartridge main body 4, with its one end retained at the corner of the front side 11 of the cartridge main body 4 and its other end retained by a spring retention recess in the spring retention lug 17 of the shutter 12, for biasing the shutter 12 in the direction of closing the aperture 8, as shown by arrow A in FIG. 2.

At the other corner on the front side 11 of the cartridge main body 4, there is provided the shutter locking member 24 for locking the shutter 12 in the position of closing the aperture 8 when the shutter 12 is at this position. The shutter locking member 24 is comprised of an attachment section 29 adapted for attachment to the cartridge main body 4, a resilient flexible section 26 extending from section 25 and a locking section 28 provided at the distal end of the flexible section 26 and having a recess 27 engaged by the locking lug 18 of the shutter 12. The shutter locking member 24 is mounted within the interior of the cartridge main body 4 by means of the attachment section 25 so that the locking section 28 at the distal end of the deflective section 26 is projected into the shutter opening/closure member inserting groove 16.

Figure 3:
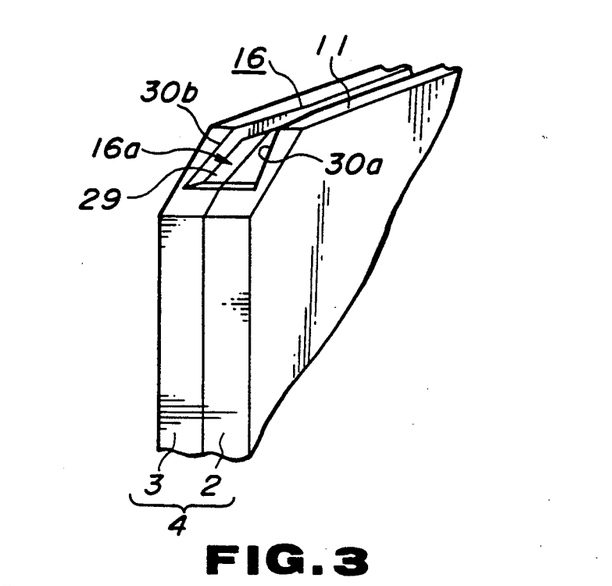
FIG. 3 is a partial perspective view showing an opening end of a shutter opening/closure member inserting groove provided in the disc cartridge shown in FIG. 1.

The shutter opening/closure member introducing groove 16 is formed on the front side 11 of the cartridge main body 4 over a sliding range of the shutter 12, beginning at the vicinity of the side 9 of the cartridge main body 4 extending normal to the sliding direction of the shutter 12. Referring to FIG. 3, the groove 16 has its end in the vicinity of the side 9 of the cartridge main body 4 as an opening end 16a in which a shutter opening/closure member of a recording/reproducing apparatus is introduced. Referring to FIG. 3, the corner towards the side 9 of the cartridge main body 4 provided with the opening end 16a is formed as an inclined surface 29, while the opposite inner sides towards the opening end 16a of the groove 16 are formed as inclined guide surfaces 30a, 30b for assuring and facilitating insertion and engagement of the shutter opening/closure member in the shutter opening/closure member introducing opening 16.

The lower half 3 of the cartridge main body 4 is provided with openings 31, 32 engaged by positioning pins adapted for fixing the horizontal loading position of the disc cartridge 1 on loading the disc cartridge 1 into the recording/reproducing apparatus. These openings 31, 32 are provided on both sides in the vicinity of the front side 11 of the cartridge main body 4, as shown in FIG. 2. It is noted that the opening 31 is circular, while the opening 32 is formed as an oblong hole having its longer axis along the sliding direction of the shutter 12 for accommodating positioning deviations with respect to the positioning pins.

The lower half 3 is also formed with disc type discriminating openings 33, 34 for discriminating the types etc. of the optical disc 5 of the disc cartridge 1. As shown in FIG. 2, these openings 33, 34 are formed in the vicinity of the rear side of the cartridge main body 4.

With the disc cartridge 1 of the present embodiment accommodating the read-only optical disc 5, the signal readout aperture 8 is provided only in the lower half 3. For this reason, the shutter 12 is not extended over the upper half 2 for closing an aperture, such that the upper half 2 is exposed to outside in its entirety. Thus the outer surface of the upper half 2, over which the shutter 12 is not extended, is utilized as a label surface 35 on which is affixed a label etc. indicating the record contents of the optical disc 5 of the disc cartridge 1. The label surface 35 is formed as a slightly recessed flat surface from which the label bonded thereto is not protruded from the surface of the cartridge main body 4.

It suffices if the cartridge main body 4 of the disc cartridge 1 is of a size just large enough to accommodate the optical disc 5 having a diameter $R_1$ equal to about 44 mm. Thus the cartridge main body 4 has a width $W_1$ in the sliding direction of the shutter 12 equal to 68 mm, a width $W_2$ in a direction normal to the sliding direction of the shutter 12 equal to 72 mm, and a thickness D equal to 5 mm. It is noted that the width $W_2$ is set so as to be larger than the width $W_1$ in order to reserve a space for accommodating the shutter locking member 24 and the torsion coil spring 23 on the front side 11 of the cartridge main body 4.

The recording/reproducing apparatus, employing the above described disc cartridge 1 as a recording medium, may be so constructed as to enable the loading while the shutter closing the aperture 8 with the sliding direction of the shutter 12 as the inserting direction is actuated so as to be opened. That is, by providing a pin-shaped shutter opening/closure member 40 for projecting on the front side 11 of the cartridge main body 4, which is loaded with the sliding direction of the shutter 12 as the introducing direction, the apparatus may be designed to enable the loading while the shutter 12 is being opened.

The operation of loading the disc cartridge of the present invention into the apparatus provided with such shutter opening/closure member 40 is hereinafter explained.

Figure 4:
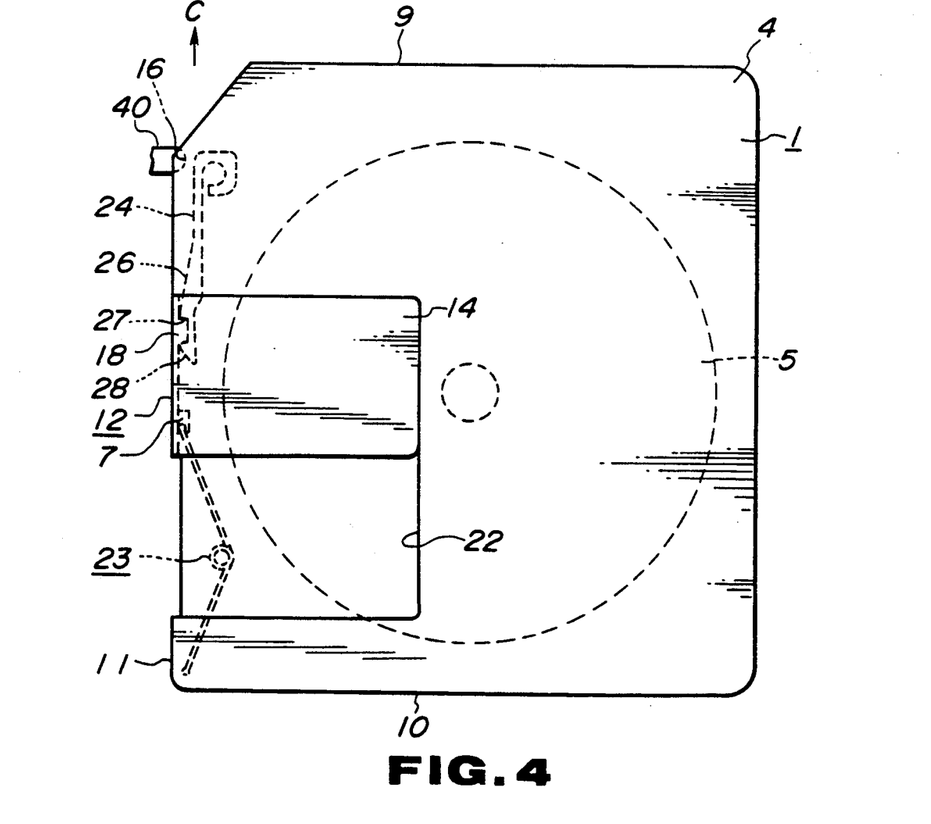
FIG. 4 is a plan view showing the state in which the shutter opening/closure member is introduced at the opening end of the shutter opening/closure member inserting groove.
Figure 5:
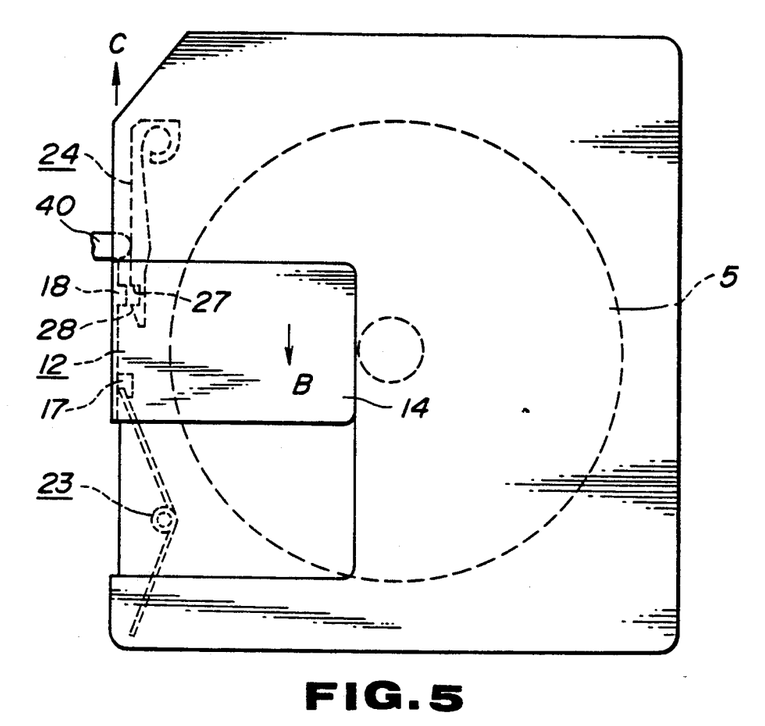
FIG. 5 is a plan view similar to FIG. 4 and showing the state in which a shutter locking member is thrust and flexed by the shutter opening/closure member for unlocking the shutter.
Figure 6:
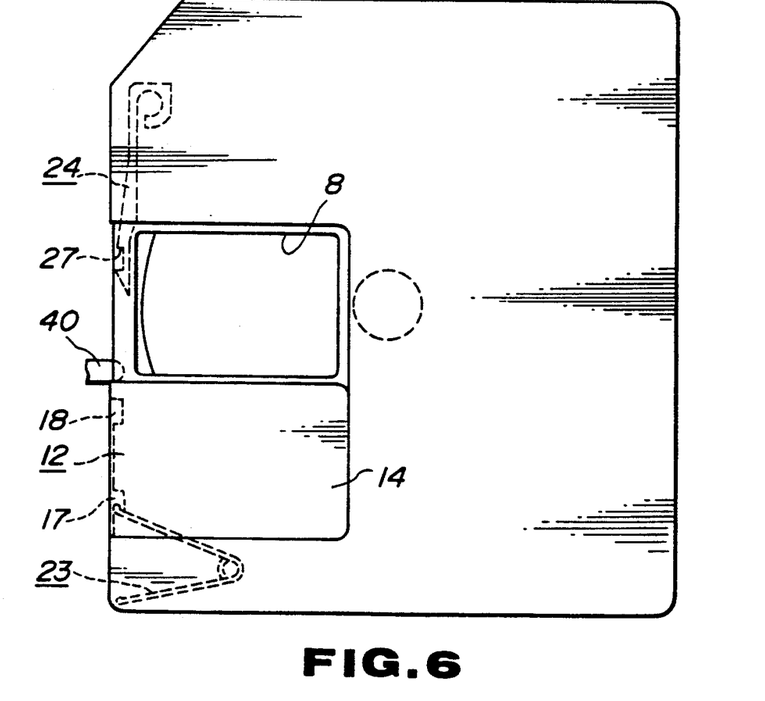
FIG. 6 is a plan view similar to FIG. 4 and showing the state in which the shutter has been moved to a position of opening the aperture.

For loading the disc cartridge to the above mentioned recording/reproducing apparatus, the disc cartridge 1 is inserted with the sliding direction of the shutter 12 as the inserting direction and with the side 9 of the cartridge main body 4 as the inserting side. If the disc cartridge 1 is inserted in this manner, the shutter opening/closure member 40 is engaged in the shutter opening/closure member introducing groove 16 having its opening end 16a on the side 9 of the cartridge main body 4. If the disc cartridge 1 is inserted further in the direction shown by an arrow C in FIG. 4, the shutter opening/closure member 40 rides on and thrusts the locking section 28 of the locking member 24 protruded into the groove 16 to deflect the resilient section 26 towards the inner side of the cartridge main body 4 for disengaging the locking lug 18 of the shutter 12 from the engaging recess 27 for unlocking the shutter 12. If the disc cartridge 1 is further introduced in the direction shown by arrow C in FIG. 5, the shutter opening/closure member 40 engaged in the groove 16 thrusts one side of the shutter 12 to slide the shutter 12 in the direction shown by arrow B in FIG. 5 against the bias of the torsion coil spring 23 to open the aperture 8 formed in the cartridge main body 4. When the disc cartridge has been inserted as far as the predetermined loading position in the recording/reproducing apparatus, the shutter 12 has been shifted to a position of fully opening the aperture 8.

With the recording/reproducing apparatus employing the above described disc cartridge, having the shutter sliding direction as the inserting direction, as a recording medium, the shutter opening mechanism may be constructed by simply providing the pin-shaped shutter opening/closure member 40 protruded on the front side 11 of the cartridge main body 4 along which slides the shutter 12.

Although the above described first embodiment of the invention is concerned with a disc cartridge accommodating a read- or reproduce-only optical disc, the present invention may also be applied to a disc cartridge provided with a magneto-optical disc 50 in which a magnetic thin film is used as a recording layer to enable recorded signals to be erased and re-recorded. Similarly to the optical disc 5, the magneto-optical disc is 64 mm in diameter and able to record musical sound signals for 74 minutes.

Figure 7:
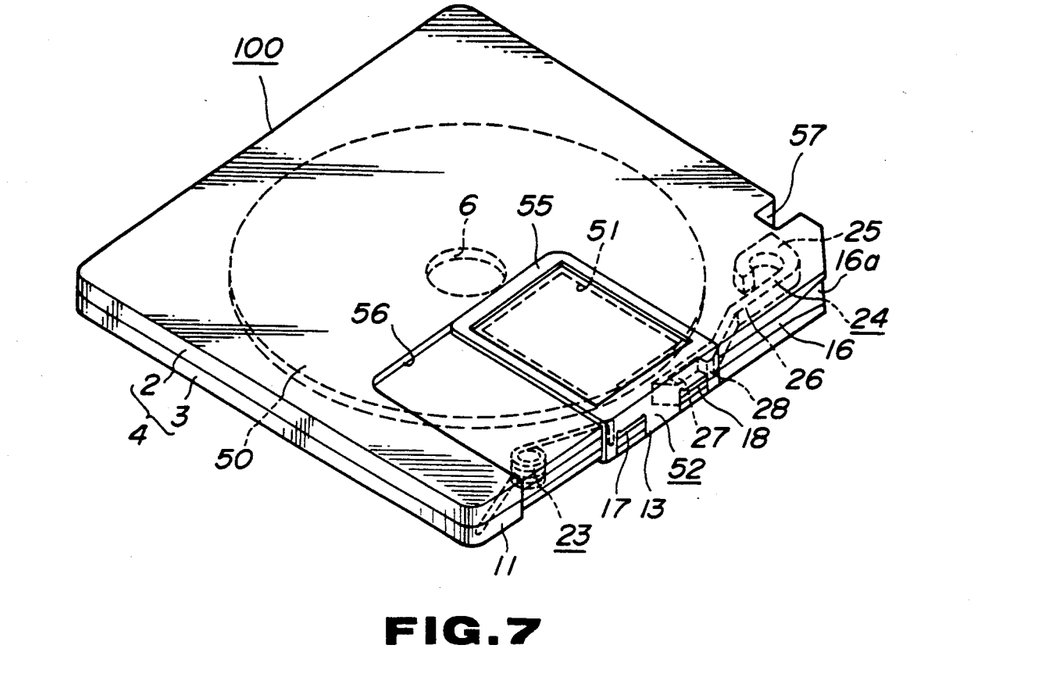
FIG. 7 is a perspective view similar to FIG. 1 and showing a disc cartridge according to a second embodiment of the present invention, as viewed from the upper side.
Figure 8:
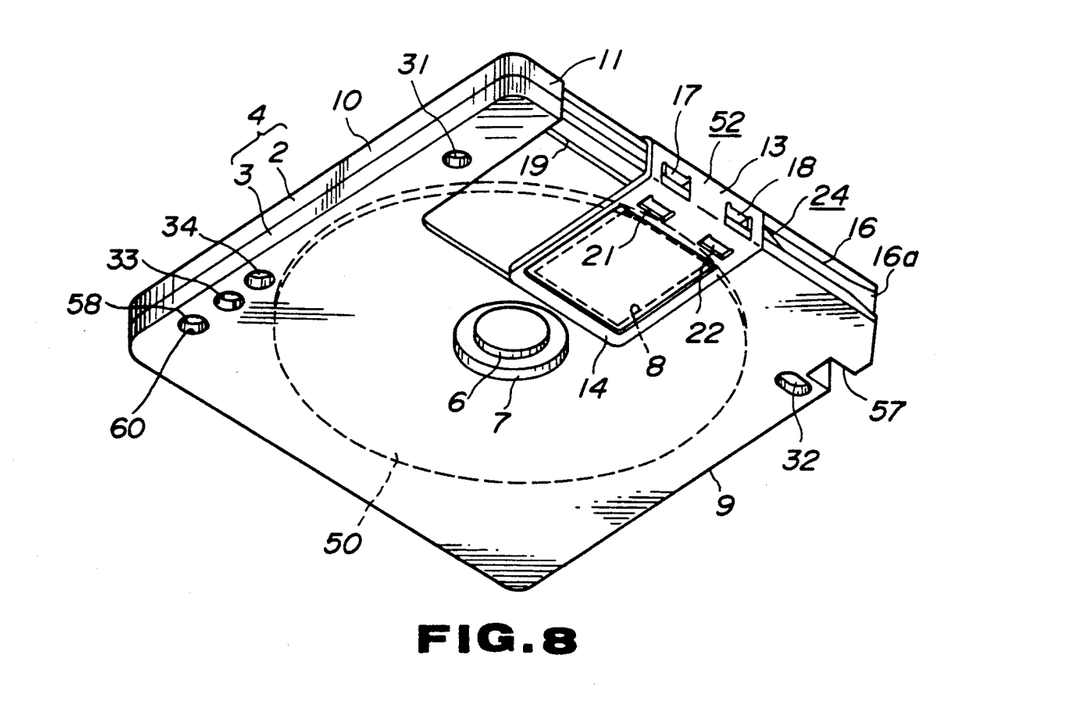
FIG. 8 is a perspective view, similar to FIG. 2, showing the disc cartridge of FIG. 7 from its lower side.

The magneto-optical disc 50 has its major surface facing an optical pickup device adapted for irradiating a laser beam on a signal recording layer, and its other major surface facing a magnetic head adapted for supplying a magnetic field to the signal recording layer for recording desired information signals. Referring to FIGS. 7 and 8, the cartridge main body 4 of the disc cartridge 100 accommodating the magneto-optical disc 50 is provided not only with an aperture 8 into which the optical pickup device of the disc cartridge 1 according to the preceding first embodiment is introduced, but also with an aperture 51 on the upper half 2 into which the above mentioned magnetic head is introduced. Similarly to the aperture 8, the aperture 51 is rectangular and large enough to partially expose the signal recording surface of the magneto-optical disc 50 to outside across its inner and outer peripheries, and is formed at a position in register with the aperture 8.

Since the disc cartridge 100 is provided with apertures 8 and 51 on the opposite sides of the cartridge main body 4, shutter sections 14, 55 for closing the apertures 8, 51, respectively, are provided in a shutter 52, which, for this reason, is in the form of a letter U in which the web is a connecting section 13 and the shutter sections 14, 55 are connected thereto and extended in a facing relation to each other. The shutter 52 is slidably mounted on the cartridge main body 4 for clamping the front side 11 of the cartridge main body 4 with the shutter sections 14, 55 extending over the apertures 8, 51, respectively. With the present disc cartridge 100, the area of sliding of the shutter 55 on the upper half 2 for closing the aperture 51 is recessed as at 56 to permit flush mounting of the shutter member 55 with respect to the surface of the cartridge main body 4.

The engaging lugs 20, 21 engaging in groove 19 in the cartridge main body 4 for slidably supporting the shutter 52 in an extraction-free manner on the cartridge main body 4, the spring retention lugs 17 and the locking lug 18 are similar in construction to those of the disc cartridge 1 of the preceding embodiment and therefore are not specifically described herein for simplicity.

Similarly, the torsion coil spring 23 for normally biasing the shutter 12 in the direction of closing the apertures 8, 51 and the shutter locking member 24 for locking the shutter 12 in the closure position, are similar in construction to those of the preceding first embodiment, and hence are not specifically described for simplicity.

The cartridge main body 4 of the disc cartridge 100 is of the same size as that of the preceding embodiment and is adapted to be selectively loaded into the recording/reproducing apparatus into which the disc cartridge 1 of the preceding embodiment is loaded.

Meanwhile, the disc cartridge 100 has a function different from that of the disc cartridge 1 of the preceding embodiment, because the magneto-optical disc 50 accommodated therein is designed for rewriting the recorded signals. That is, when the disc cartridge 100 has been loaded in position, the magnetic head needs to be intruded into the cartridge main body 4 by means of the aperture 51. Thus the cartridge main body 4 of the disc cartridge 100 is provided with a notch 57 indicating that the disc accommodated therein is the magneto-optical disc 50 capable of re-writing the signals and adapted to enable intrusion of the magnetic head into the cartridge main body 4. As shown in FIGS. 7 and 8, the notch 57 is formed on the side 9 in proximity to the front side of the cartridge main body 4. Since the magneto-optical disc 50 for re-recording of information signals is accommodated in the disc cartridge 100, the cartridge main body 4 is provided with a mistaken recording inhibiting member 58.

Figure 9:
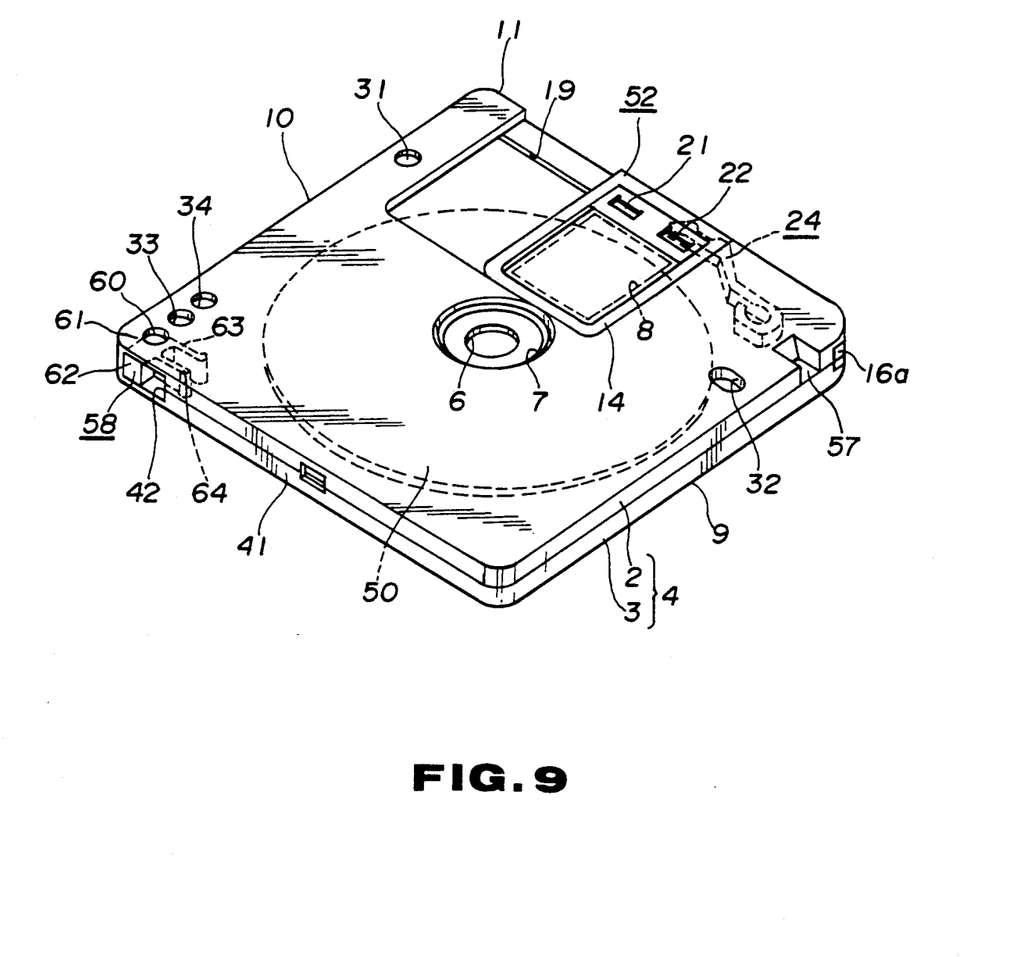
FIG. 9 is a perspective view showing the lower surface of the disc cartridge, as viewed from the rear side.

Meanwhile, turning to FIG. 9, the mistaken recording inhibiting member 58 is provided outside an area of the cartridge proper 4 occupied by the magneto-optical disc 50, more specifically, at a corner towards the lateral side 10 of the rear side 41 opposite to the front side 11 of the cartridge main body along which is provided the shutter 52. That is, the mistaken recording inhibiting member 58 is provided at a position facing the shutter locking member 24 with the magneto-optical disc 50 in-between. The mistaken recording inhibiting member 58 is moved along the rear side 41 of the cartridge proper 4 for opening or closing a mistaken recording detecting hole 60 provided at a corner of the rear side of the lower half 3 constituting the major surface of the cartridge proper 4 for indicating whether information signals may or may not be recorded on the magneto-optical disc 50.

Figure 10:
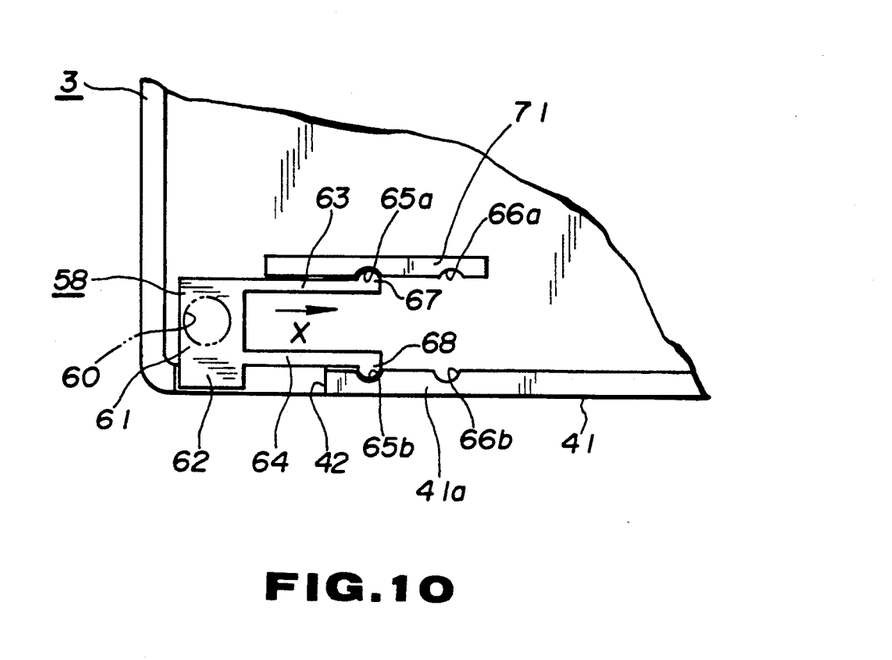
FIG. 10 is a partial plan view showing the mistaken recording inhibiting member provided in the lower half, with a mistaken recording detection opening being closed.
Figure 11:
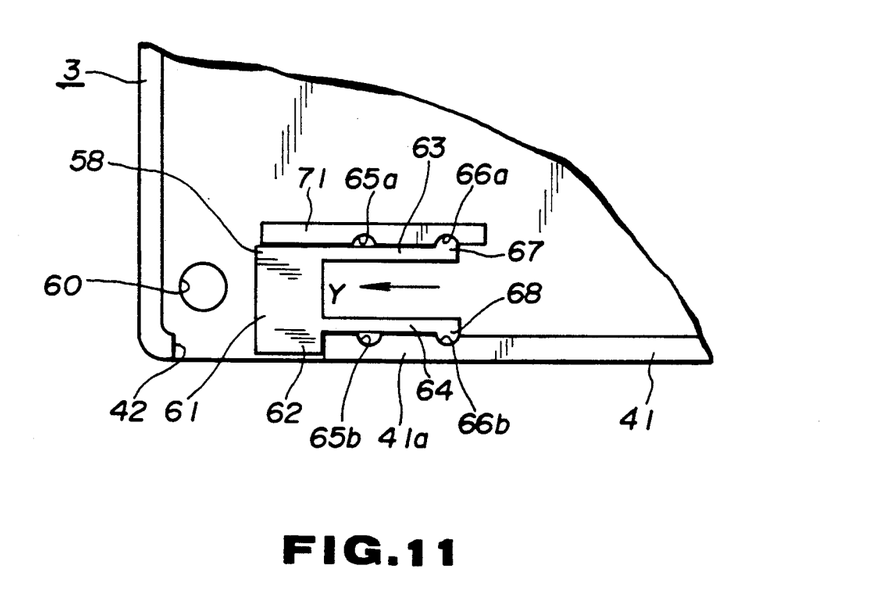
FIG. 11 is a partial plan view of the lower half showing the state in which the mistaken recording inhibiting member has been moved to a position of opening the mistaken recording detection opening.

Meanwhile, the mistaken recording inhibiting member 58 is formed from synthetic resin and, as shown in FIG. 10 and 11, has a main body 61 for opening or closing the detecting hole 60 which is adapted for indicating whether recording may or may not be made on the magneto-optical disk 50. An operating lug 62 is formed integrally with the main body 61 so that at least a part of the lug 62 is exposed to outside via an operating window 41 formed by segmenting a part of the rear side 41 of the cartridge main body 4 which is at right angles to the surface of the main body 61 opening or closing the mistaken recording detecting hole 60 and which runs parallel to the direction of opening or closing the hole 60. Resiliently flexible arms 63, 64 are extended from the main body 61 parallel to each other and to the direction of movement of the main member 61 for opening or closing the hole 60. On the outer sides of the distal ends of the arms 63, 64 are formed engaging means 67, 68 adapted for being selectively engaged in first mating engaging means 65a, 65b and second mating engaging means 66a, 66b provided within the cartridge main body 4.

Turning again to FIG. 4, the cartridge main body 4 is provided with the mistaken recording detecting hole 60 and a guide 70 adapted for guiding the mistaken recording inhibiting member 58 parallel to the rear side 41 between the first position of opening the detecting hole 60 and the second position of closing the hole 60 by the main body 61. The guide 70 is constituted by a part 41a of the rear side 41 and a guide wall 71 provided upright on the lower half 3 parallel to the rear side 41. Turning to FIGS. 10 and 11, the mistaken recording inhibiting member 58 is mounted so as to be fitted between the part 41a of the rear side 41 and the guide wall 71, with the operating lug 62 disposed within the operating window 42 formed by segmenting a part of the rear side 41 and with the arms 63, 64 resiliently flexed in a direction towards each other. The mistaken recording inhibiting member 58, thus mounted within the cartridge main body 4, is guided by the guide 70 and moved parallel to the rear side 41 in a direction shown by an arrow X in FIG. 10 or in a direction shown by an arrow Y in FIG. 11, such as by manually thrusting or nipping the lug 62 exposed to outside of the cartridge main body 4 via the operating window 42.

On the facing sides of the part 41a of the rear side 41 and the guide wall 71, there are formed the first mating engaging means 65a, 65b as grooves and the second mating engaging means 66a, 66b, similarly as grooves, into which the engaging means 67, 68 provided the mistaken recording inhibiting member 58 are selectively engaged, respectively. As shown in FIG. 10, the first mating engaging means 65a, 65b are provided at positions engaged by the engaging means 67, 68 at the distal ends of the arms 63, 64 when the mistaken recording inhibiting member 58 is moved to the first position of opening the hole 60 by the main body 61. Similarly, as shown in FIG. 11, the second mating engaging means 66a, 66b are provided at positions engaged by the engaging means 67, 68 at the distal ends of the arms 63, 64 when the mistaken recording inhibiting member 58 is moved to the second position of closing the hole 60 by the main body 61.

By providing the first mating engaging means 65a, 65b and the second mating engaging means 66a, 66b, selectively engaged by the engaging means 67, 68, the mistaken recording inhibiting member 58 is controlled in its movement, that is, it is moved between and maintained at the first position of opening the hole 60 and the second position of closing the hole 60, for positively maintaining the opened or closed state of the hole 60.

Thus the arms 63, 64, provided with the engaging means 67, 68, engaged with the first mating engaging means 65a, 65b or with the second mating engaging means 66a, 66b provided at the guide 70, make up controlling means for controlling the positions of the movement of the mistaken recording inhibiting member 58.

Thus, by nipping the operating lug 62 exposed to outside via the operating window 42 formed in the rear side 41 of the cartridge main body 4 facing the front side 12 for shifting the lug in the direction shown by arrow X in FIG. 10 or in the direction shown by arrow Y in FIG. 11, the hole 60 provided in the major surface of the lower half 3 normal to the rear side 41 is opened or closed by the mistaken recording inhibiting member 58 provided in the cartridge main body 4. With the mistaken recording inhibiting member 58 thus shifted to the first position of opening the hole 60 as shown in FIG. 11, recording of information signals on the magneto-optical disc 50 accommodated within the cartridge main body 4 is inhibited. With the member 58 shifted to the second position in which the hole 60 is closed by the main body 62 as shown in FIG. 10, recording on the magneto-optical disc 50 accommodated in the cartridge main body 4 is enabled.

The disc cartridge 100 is also provided with a disc discriminating holes 33, 34 constituting discriminating means for discriminating the types or sorts of the magneto-optical disc 50 accommodated within the cartridge main body 4. The discriminating means are provided for discriminating between the magneto-optical discs of different storage capacities occasionally accommodated within the disc cartridge 100.

Referring to FIG. 9, the discriminating holes 33, 34 are provided adjacent to the hole 60 along the lateral side 10 of the lower half 3 constituting the lower major surface of the cartridge main body 4.

With the above described disc cartridge 100, since the mistaken recording detecting hole 60 and the disc discriminating holes 33, 34 are provided within the lower major surface of the cartridge main body 4, mistaken recording inhibiting means and disk discriminating means may be provided within the major surface of the disc cartridge 100 to contribute to size reduction of the recording and/or reproducing apparatus into which is loaded the disc cartridge 100.

Since the mistaken recording inhibiting member 58 is adapted to open or close the hole 60 formed in the lower major surface of the cartridge main body 4 with the operating lug 61 disposed in the rear side 41 of the cartridge main body 4, the inhibiting member 58 may be designed as a small-sized member and housed in a small housing space in the small-sized cartridge main body 4. In addition, since the mistaken recording inhibiting member 58 is moved freely within the cartridge main body 4 to open or close the hole 60, the recording or non-recording state on the magneto-optical disk 50 may be selected optionally.

Although the mistaken recording inhibiting member 58 is arranged in the cartridge main body 4 with the operating lug 62 disposed at the rear side 41 of the cartridge main body 4, it may also be arranged with the operating lug 62 disposed at the lateral side 10 of the cartridge main body 4, in which case the mistaken recording detection hole 60 and the disc discriminating holes 33, 34 are provided side by side along the rear side 41 of the cartridge main body 4. Since only the disposition of the mistaken recording inhibiting member 58 is changed and the arrangement is otherwise the same as that of the preceding disc cartridge 10, detailed description is omitted for simplicity.

Figure 12:
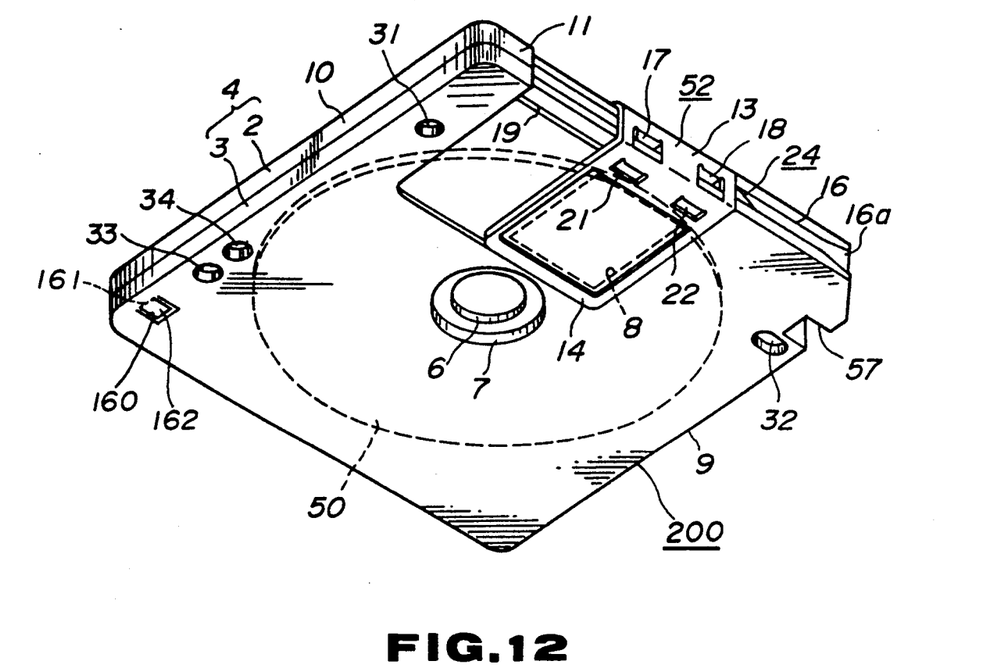
FIG. 12 is a perspective view showing a modification of the mistaken recording detection means, as viewed from the lower side of the disc cartridge.
Figure 13:
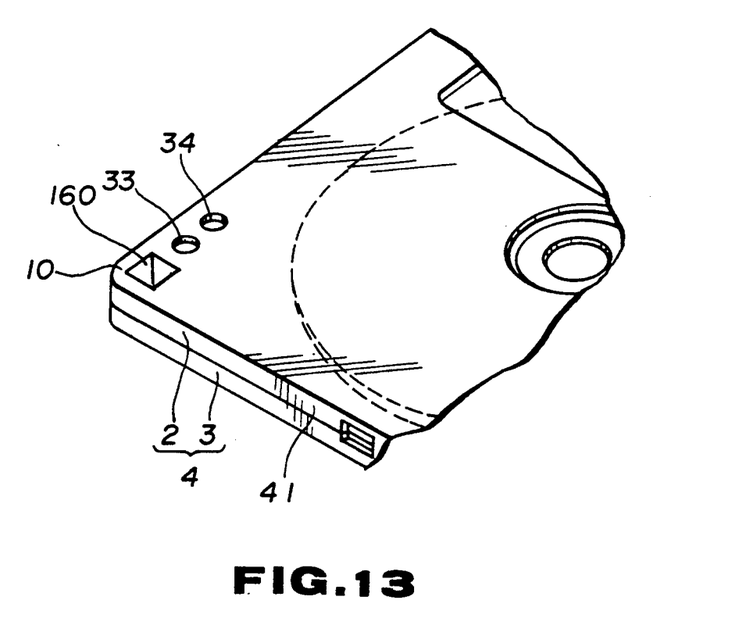
FIG. 13 is a partial perspective view of a disc cartridge in which a rupturable piece has been removed to open the mistaken recording detection opening.

Although the mistaken recording detecting means in the above described disc cartridge 100 is constituted by the detecting hole 60 opened or closed by the mistaken recording inhibiting member 58 movable within the cartridge main body 4, the mistaken recording inhibiting means may also be constituted by a rectangular mistaken recording detecting hole 160 formed in the lower half 3 constituting the lower major surface of the cartridge main body 4 and a rupturable piece 162 connected to the lower half 3 by a weakened connecting portion 161 for closing the detecting hole 160. With the rupturable piece 162 not being severed from the lower half 3 but closing the hole 160, recording on the magneto-optical disc 50 is enabled. On the contrary, with the piece 162 being ruptured along the weakened connecting portion 161 as shown in FIG. 13 for opening the mistaken recording detecting hole 160, recording on the magneto-optical disk 50 is inhibited.

Although it is not possible with a disc cartridge 200 provided with the rupturable piece 162 as mistaken recording detecting means to select the recording state or the non-recording state optionally, as in the case of a disc cartridge employing the mistaken recording inhibiting member 58, the construction of the mistaken recording detecting means may be correspondingly simplified.

Similarly to the disc cartridge 1 of the preceding first embodiment, the disc cartridge 100 is loaded on a recording/reproducing apparatus provided with the pin-shaped shutter opening/closure member 40 protruded on the front side 11 of the cartridge main body which is inserted along the sliding direction of the shutter 52. Since the operation of loading the disc cartridge 100 on the recording/reproducing apparatus is therefore similar to that of loading the disc cartridge 1 of the preceding embodiment, detailed description therefor is omitted for clarity.

Since the disc cartridge 1 of the preceding first embodiment and the disc cartridge 100 of the second embodiment are both approximately square in contour, the direction of inserting it into the recording/reproducing apparatus may be recognized easily. On the other hand, with the disc cartridge 100 of the present second embodiment, since the opening 7 intruded by the disc table and the aperture 8 exposed to the optical pickup device are formed independently of each other, with a web portion in-between, constraints are imposed on the radial range of the magneto-optical disc 50 which is exposed to outside by means of the aperture 8. Thus, with the magneto-optical disc 50 in which a signal recording region extends to close to the centering hole 6 as a result of high density recording, there is a risk that the signal recording region can not be exposed as far as the inner periphery of the recording region. Besides, there is a risk that the optical pickup device can not be transferred as far as the inner periphery of the signal recording region so that signal recording/reproduction is rendered impossible.

Figure 14:
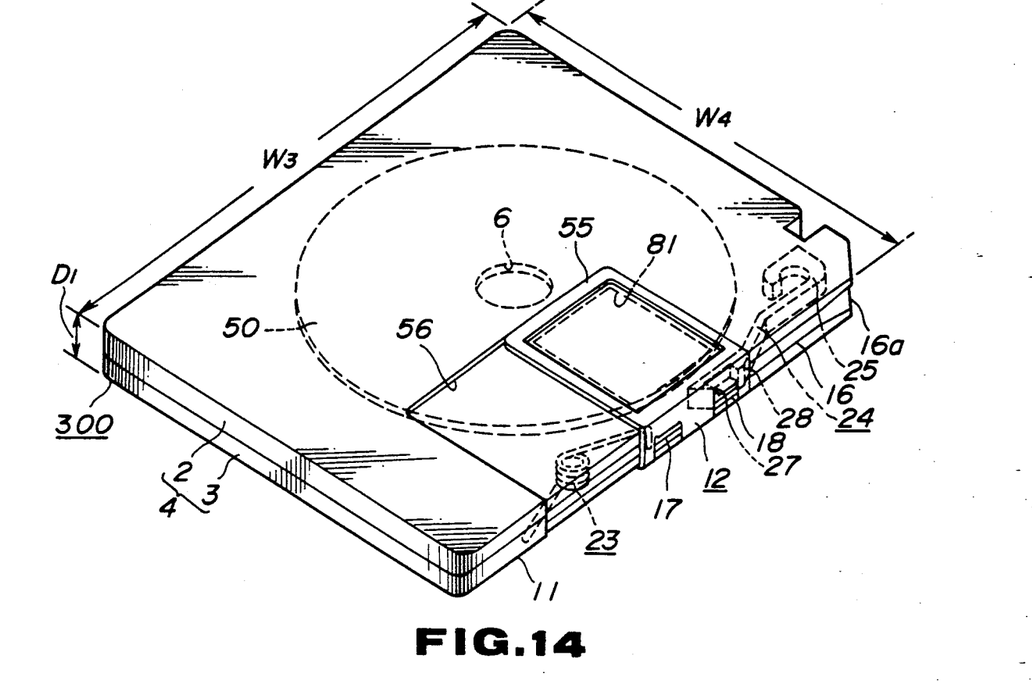
FIG. 14 is a perspective view, similar to FIG. 1, and showing a disc cartridge according to a third embodiment of the present invention, as viewed from the upper side.
Figure 15:
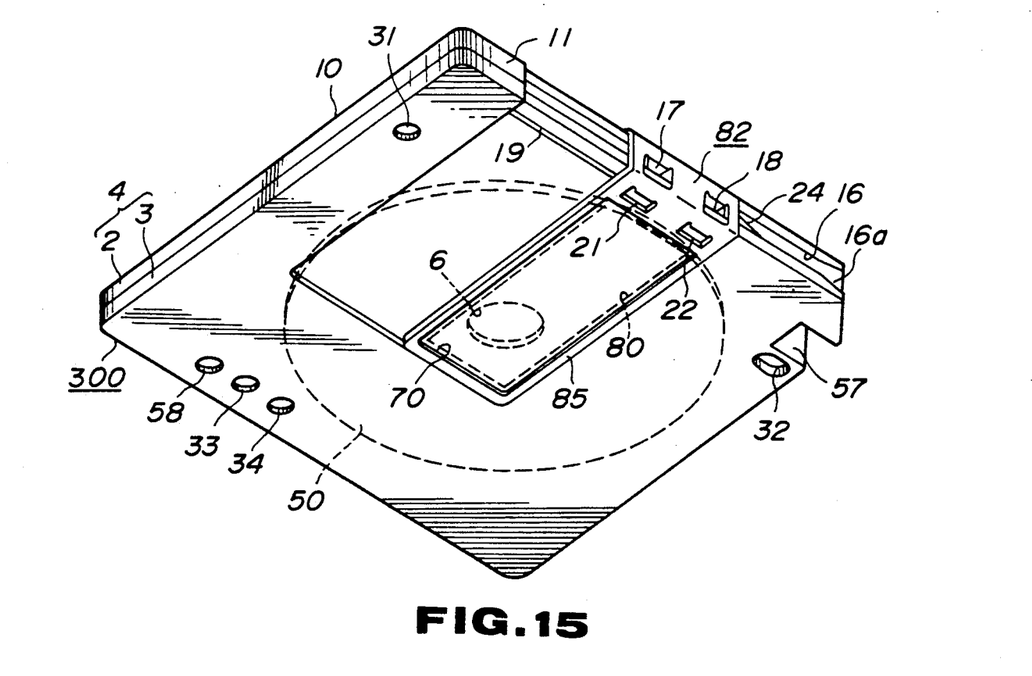
FIG. 15 is a perspective view, similar to FIG. 2, and showing the disc cartridge of FIG. 14 from its lower side.

With this in view, a cartridge main body 4 of a disc cartridge 300 shown in FIGS. 14 and 15 is formed as a rectangle in which the width $W_3$ in the sliding direction of the shutter 82 is selected to be sufficiently larger than the width $W_4$ in the direction normal to the sliding direction of the shutter 82 to facilitate the recognition of the inserting direction into the recording/reproducing apparatus as well as to prevent mistaken insertion. The cartridge main body 4 has the width $W_3$ in the sliding direction of the shutter 12 of 78 mm, the width $W_2$ in the direction normal to the sliding direction of the shutter 12 of 72 mm and a thickness $D_1$ of 5.3 mm. With such increase in width $W_3$, an aperture 70 intruded by the disc table and an aperture 80 exposed to the optical pickup device are continuous to each other, as shown in FIG. 15. It is noted that, in order to keep with up an increased size of the cartridge main body 4, the widths of the aperture 80 and an aperture intruded by the magnetic head are selected to be wider than those of the disc cartridge 100 of the preceding second embodiment. If the aperture 80 is continuous to the aperture 70 intruded by the disc table, the magneto-optical disc 50 having its signal recording region extending to a position close to the centering hole 6 may be completely exposed to outside as far as the inner periphery of the disc. The optical pickup device may be positively transferred to the inner periphery of the signal recording region. Also, by having broader widths of the apertures 80, 81, the optical pickup device and the magnetic head may face each other across the inner and outer peripheries of the magneto-optical disc 50, even if the optical head pickup device and the magnetic head are not reduced in size.

With the disc cartridge 300, since the aperture 70 intruded by the disc table and the aperture 80 exposed to the optical pickup device are continuous to each other, it is necessary to close the aperture 70 simultaneously if it is desired to close the aperture 80 positively. Thus the shutter 82 has a shutter section 85 overlying the aperture 80 which section 85 is of a size large enough to cover the aperture 70 simultaneously.

It is noted that, similarly to the disc cartridge 100 of the preceding second embodiment, the disc cartridge 300 is adapted to be loaded into a recording/reproducing apparatus provided with a pin-shaped shutter opening/closing member 40 projecting towards the front side 11 of the cartridge main body 4 which is inserted along the sliding direction of the shutter 82. Therefore, the operation of loading the disc cartridge 300 into the recording/reproducing apparatus is similar to that of the disc cartridge 100 of the preceding embodiment, and hence the detailed description therefor is not made herein for clarity.

With the above described disc cartridge of the present invention, the shutter is biased by the shutter resetting spring to a position of closing the aperture adapted for at least partially exposing the optical recording medium along its radius, and is locked by the shutter locking member, the cartridge may be closed hermetically reliably to achieve protection of an optical recording medium, such as an optical disc or a magneto-optical disc, with which it is necessary to prevent the slightest scoring or affixture of the smallest amount of dust and dirt to the signal recording surface if high density recording is to be achieved.

When loading the disc cartridge to the recording/reproducing apparatus, the shutter opening/closure member provided on the apparatus is introduced into the opening end of the shutter opening/closure member inserting groove at the side of the cartridge main body lying orthogonally to the sliding direction of the shutter, and is relatively moved along the inserting direction of the cartridge main body to deflect the shutter locking member for unlocking the shutter. Thus the shutter is slid against the bias of the shutter resetting spring to open the above mentioned aperture. Thus the shutter opening/closure member of the recording/reproducing apparatus may be simply constituted by a pin-shaped member projecting on the front side of the cartridge main body along which slides the shutter. As a result, the shutter opening/closure mechanism may be simplified in construction to contribute to reduction in size of the recording/reproducing apparatus.

What is claimed is:

1. A disc cartridge for accommodating a disc-shaped optical recording medium having a hub, the disc cartridge comprising:
    a cartridge main body having a centering opening that exposes the hub of the optical recording medium to the outside, a head insertion opening that radially exposes a portion of the optical recording medium to the outside, and a longitudinal groove with a lock opening that guides an external shutter-opening member;
    a shutter having a locking lug and being slidably mounted on the cartridge main body between an open position and a closed position, the shutter exposing the head insertion opening and a portion of the longitudinal groove to the outside when in the open position, the shutter covering the head insertion opening and the portion of the longitudinal groove when in the closed position;
    a resilient flexible shutter locking member movable between a locked position and an unlocked position having a locking projection and a locking recess and being connected to the cartridge main body, the locking projection extending into the lock opening, the locking recess engaging the locking lug and locking the shutter in the closed position when in the locked position, the locking recess disengaging the locking lug and unlocking the shutter in the unlocked position,
    whereby the shutter is opened when the external shutter-opening member moving along the longitudinal groove depresses the locking projection, thereby disengaging the locking recess from the locking lug, and then pushes the shutter from the closed position to the open position.

2. A disc cartridge according to claim 1 wherein the cartridge main body further includes a pair of positioning holes that engage a pair of positioning pins to fix the horizontal position of the disc cartridge when the disc cartridge is loaded into a recording and reproducing apparatus.

3. A disc cartridge according to claim 1 wherein the cartridge main body is formed from a pair of halves, only one of which includes the head insertion opening and wherein said shutter further includes:
    a closure section that covers the head insertion opening when in the closed position;

a frictional contacting section that frictionally the top side; and a connecting section that interconnects the closure section and the frictional contacting section and is formed with the locking lug.

4. A disc cartridge according to claim 1 wherein the cartridge main body is formed from a pair of interconnected halves, both of which include the head insertion opening, and wherein the shutter is constituted by a pair of closure sections and a connecting portion interconnecting the pair of closure sections and provided with the locking lug.

5. A disc cartridge according to claim 1 wherein the disc cartridge further comprises biasing means for normally biasing the shutter in the closed position, the shutter locking member being connected to the cartridge main body on one side of the head insertion opening and the biasing means being connected to the cartridge main body on the opposite side of the head insertion opening.

6. A disc cartridge according to claim 1 and further comprising mistaken recording inhibiting means formed in the cartridge main body for indicating whether information can be recorded on the disc cartridge.

7. A disc cartridge according to claim 6 wherein the mistaken recording inhibiting means comprises a mistaken recording inhibiting member movable with respect to the optical recording medium between a first position indicating a signal recordable position and a second position indicating a signal unrecordable position.

8. A shutter for covering a head insertion opening of a disc cartridge, the shutter comprising:
    a closure section that covers the head insertion opening on the disc cartridge when the shutter is in a closed position;
    a frictional contacting section that frictionally contacts a portion of the disc cartridge; and
    a connecting section having a locking lug and interconnecting the closure section and the frictional contacting section, the locking lug engaging a locking recess of a shutter locking member when the closure section is in the closed position,
    wherein the closure section, the frictional contacting section, and the connecting section are formed as one piece.

9. A shutter according to claim 8 wherein the frictional contacting section is of a shorter length than the closure section.

10. A disc cartridge for accommodating a disc-shaped optical recording medium having a hub, the disc cartridge comprising:
    a cartridge main body having a centering opening that exposes the hub of the optical recording medium to the outside, a head insertion opening that radially exposes a portion of the optical recording medium to the outside, and a longitudinal groove with a lock opening that guides an external shutter-opening member, the longitudinal groove having an opening end on a side of the cartridge main body normal to a sliding direction of the shutter and being formed on a front side of the cartridge main body extending parallel to the sliding direction of the shutter;
    a shutter having a locking lug and being slidably mounted on the cartridge main body between an open position and a closed position, the shutter exposing the head insertion opening and a portion of the longitudinal groove to the outside when in the open position, the shutter covering the head insertion opening and the portion of the longitudinal groove when in the closed position;
    a resilient flexible shutter locking member movable between a locked position and an unlocked position having a locking projection and a locking recess and being connected to the cartridge main body, the locking projection extending into the lock opening, the locking recess engaging the locking lug and locking the shutter in the closed position when in the locked position, the locking recess disengaging the locking lug and unlocking the shutter in the unlocked position; and
    mistaken recording inhibiting means for indicating whether information can be recorded on the disc cartridge provided at a corner on a major surface of the cartridge main body on a side parallel to the front surface of the cartridge main body provided with the longitudinal groove.

11. A disc cartridge according to claim 10 wherein the mistaken recording inhibiting means comprises a mistaken recording inhibiting member movable with respect to the optical recording medium between a first position indicating a signal recordable position and a second position indicating a signal unrecordable position, the inhibiting member being provided on one of a pair of sides constituting a corner of a major surface of lateral sides parallel to the front side of the cartridge main body provided with the longitudinal groove.

12. A disc cartridge according to claim 10 wherein the disc-shaped optical recording medium is substantially 64 mm in diameter and can be rotated from outside.

13. A disc cartridge according to claim 12 wherein the cartridge main body further includes a pair of positioning holes that engage a pair of positioning pins to fix the horizontal position of the disc cartridge when the disc cartridge is loaded into a recording and reproducing apparatus, the pair of positioning pins being formed on opposite sides of the sliding direction of the shutter.

14. A disc cartridge according to claim 13 wherein the positioning holes are provided so as to be closer to one major surface of the cartridge main body towards the front side formed with the longitudinal groove than the center of the disc-shaped recording medium accommodated in the cartridge main body.

15. A disc cartridge for accommodating a disc-shaped optical recording medium having a hub, the disc cartridge comprising:
    a cartridge main body having a centering opening that exposes the hub of the optical recording medium to the outside, a head insertion opening that radially exposes a portion of the optical recording medium to the outside, and a longitudinal groove with a lock opening that guides an external shutter-opening member;
    a shutter having a locking lug and being slidably mounted on the cartridge main body between an open position and a closed position, the shutter exposing the head insertion opening and a portion of the longitudinal groove to the outside when in the open position, the shutter covering the head insertion opening and the portion of the longitudinal groove when in the closed position;
    a resilient flexible shutter locking member movable between a locked position and an unlocked position having a locking projection and a locking recess and being connected to the cartridge main body, the locking projection extending into the lock opening, the locking recess engaging the locking lug and locking the shutter in the closed position when in the locked position, the locking recess disengaging the locking lug and unlocking the shutter in the unlocked position; and a mistaken recording inhibiting member mounted on the cartridge main body for movement in a direction normal to the direction of thickness of the recording medium, the mistaken recording inhibiting member including:

a main body for opening or closing a detecting hole that indicates the recordability or non-recordability of information signals on the recording medium, an operating lug formed integrally with the main body so that a part of the operating lug is exposed to the outside via an operating window provided in a side of the cartridge main body, a controlling section for controlling the movement of the main body between an open position and a closed position, the open position corresponding to an open detecting hole, the closed corresponding to a closed detecting hole.

16. A disc cartridge according to claim 15 wherein the operating window is formed in a side of the cartridge body facing the front side of the cartridge main body.

17. A disc cartridge according to claim 15 wherein the mistaken recording inhibiting member is mounted in the cartridge main body for movement in a direction normal to the thickness of the optical recording medium and in a direction along the side facing the front side of the cartridge main body.

18. A disc cartridge according to claim 15 wherein the controlling section of the mistaken recording inhibiting member comprises a pair of arms facing each other in a direction parallel to the direction of opening or closing of the detecting hole by the main body, each arm having engaging sections that engage with mating engaging sections formed on an inner side and an inner guide wall of the cartridge main body, the operating window being formed in the side parallel to the direction that the main body opens and closes the detecting hole.

19. A disc cartridge for accommodating a disc-shaped optical recording medium having a hub, the disc cartridge comprising:

a cartridge main body having a centering opening that exposes the hub of the optical recording medium to the outside, a head insertion opening that radially exposes a portion of the optical recording medium to the outside, and a longitudinal groove with a lock opening that guides an external shutter-opening member;

a shutter having a locking lug and being slidably mounted on the cartridge main body between an open position and a closed position, the shutter exposing the head insertion opening and a portion of the longitudinal groove to the outside when in the open position, the shutter covering the head insertion opening and the portion of the longitudinal groove when in the closed position;

a resilient flexible shutter locking member movable between a locked position and an unlocked position having a locking projection and a locking recess and being connected to the cartridge main body, the locking projection extending into the lock opening, the locking recess engaging the locking lug and locking the shutter in the closed position when in the locked position, the locking recess disengaging the locking lug and unlocking the shutter in the unlocked position;

discriminating means provided in a major surface of the cartridge main body for discriminating the type of optical recording medium; and a mistaken recording inhibiting member provided in the major surface of the cartridge main body for indicating recordability or non-recordability of information signals on the optical recording medium.

20. A disc cartridge according to claim 19 wherein the mistaken recording inhibiting member is mounted on the cartridge main body for movement in a direction normal to the direction of thickness of the recording medium, the mistaken recording inhibiting member including:

a main body adapted for opening or closing a detecting hole that indicates the recordability or non-recordability of information signals on the recording medium, an operating lug formed integrally with the main body so that a part of the operating lug is exposed to the outside via an operating window provided in a side facing the front side of the cartridge main body parallel to the sliding direction of the shutter, a controlling section for controlling the movement of the main body between an open position and a closed position, the open position corresponding to an open detecting hole, the closed corresponding to a closed detecting hole.

21. A disc cartridge according to claim 19 wherein the mistaken recording inhibiting member is provided in a hole formed in at least one major surface of the cartridge main body via a connecting portion rupturable from the cartridge main body.

* * * * *